Dec. 24, 1963 W. L. LINDGREN 3,115,283
PROPANE CONTAINER AND METHOD OF MAKING SAME
Filed July 3, 1962 2 Sheets-Sheet 1

INVENTOR.
William L. Lindgren
BY
ATTORNEYS

United States Patent Office 3,115,283
Patented Dec. 24, 1963

3,115,283
PROPANE CONTAINER AND METHOD OF MAKING SAME
William L. Lindgren, Sycamore, Ill., assignor to Turner Corporation, Sycamore, Ill., a corporation of Illinois
Filed July 3, 1962, Ser. No. 207,237
7 Claims. (Cl. 222—394)

This invention relates generally to a fuel cylinder assembly and to a method of making the same wherein a drawn tank having a pierced opening formed as an embossment carries a bushing member produced as a separate article of manufacture and which is characterized by a center valve passage with inner and outer concentrically disposed rings at the outermost end of the bushing to facilitate assembly of a plastic coupling member thereto and also providing a greatly reduced sealing area inwardly of the inner ring to facilitate filling of the tank.

It is an object of the present invention to provide a fuel cylinder assembly which utilizes axially adjacent connected-together plastic and metal bushing parts wherein the only function of the plastic bushing is to effect a coupling action.

Another object of the present invention is to provide an inlet construction for a fuel cylinder assembly wherein the essential sealing action is effected by a unitary metal bushing brazed to the tank to establish and maintain the integrity of the sealed joint, thereby avoiding the necessity of mixing materials as is frequently necessitated by the utilization of a crimped gasket-carrying structure.

A further object of the invention is to provide an improved tank fabricating process wherein a brazed bushing provides a greatly reduced sealing area to facilitate filling of the tank with fuel.

A still further object of the present invention is to provide interconnected plastic and metal bushings wherein the plastic bushing is characterized by a recessed lip and the metal bushing has a correspondingly offset ring filling the recess of the lip, thereby to minimize the weakness of the weakest cross-sectional point on the plastic bushing.

Many other features, advantages and additional objects of the present invention will become manifest to those versed in the art upon making reference to the detailed description which follows and the accompanying sheet of drawings in which a preferred structural embodiment of a fuel cylinder assembly incorporating the principles of the present invention will be shown by way of illustrative example.

Figure 3:
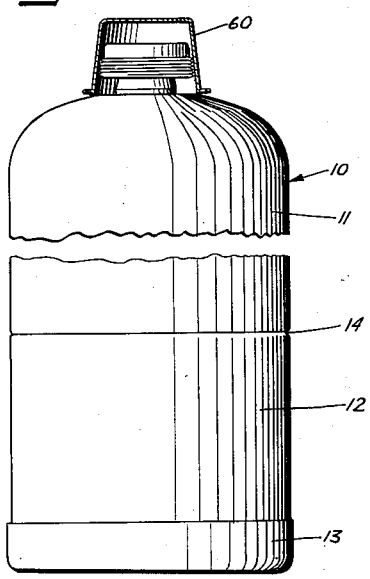
FIGURE 3 is a reduced fragmentary view of a fuel cylinder assembly wherein the bushing construction of the present invention is capped for cleanliness and ready for sale and distribution.

In accordance with the principles of the present invention, a fuel cylinder is provided which is shown generally at 10 and which may include an upper portion 11, a lower portion 12, and a foot ring 13. The upper and lower portions are joined together at a seam 14 and each may be formed by a suitable drawing operation, thereby changing the shape of a metal blank into a cup-shaped article suitably proportioned so that the upper and lower portions together form a fuel tank, as illustrated in FIGURE 3.

Figure 1:
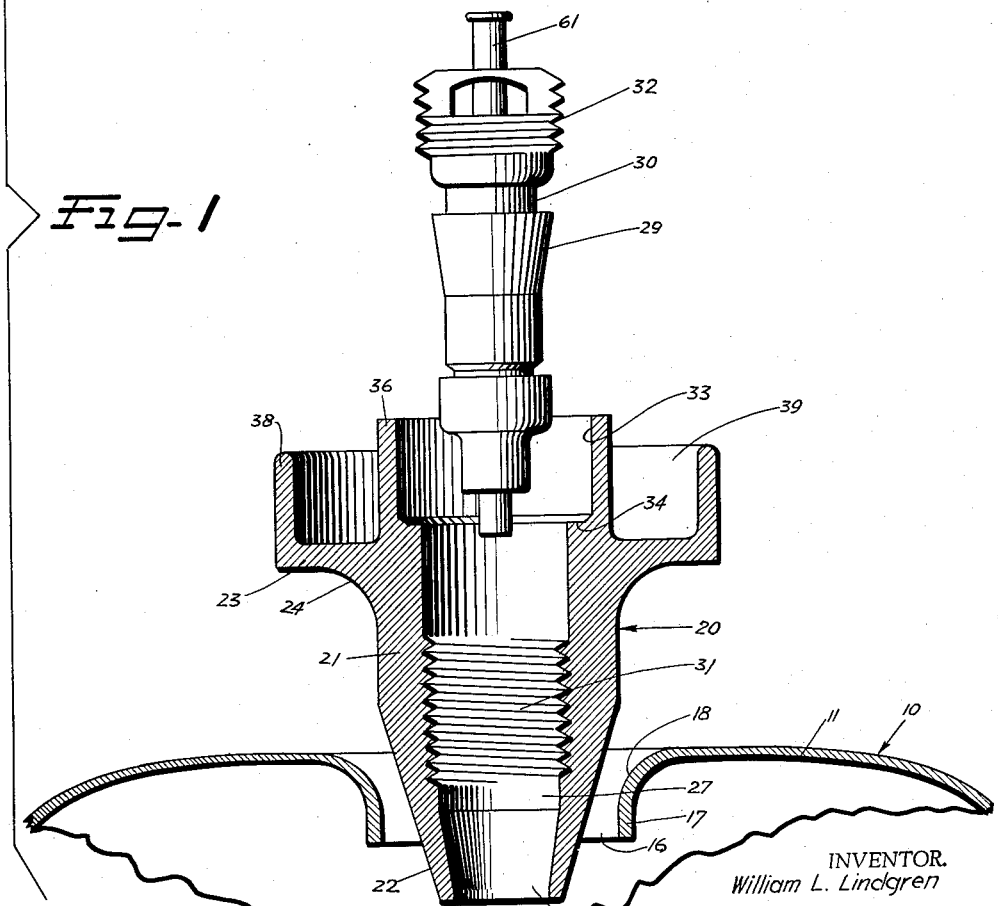
FIGURE 1 is an exploded view showing the details of construction of the independently produced articles which are ultimately combined to provide the fuel cylinder assembly of the present invention and by means of which the steps of the method of the present invention may be clearly understood.

The drawn upper portion 11 is particularly characterized by the piercing of a center aperture therein shown at 16 and which is preferably formed as an embossment 17 turned inwardly towards the interior of the fuel cylinder 10. The embossment 17 has a curved surface configuration identified in FIGURE 1 at 18.

Formed as a separate article of manufacture by screw machine fabricating techniques, is a metal bushing shown generally at 20. The bushing 20 is particularly characterized by a generally cylindrical body portion 21 and a tapered inner end 22.

At the top of the body portion 21 there is a radially outwardly extending flange 23. Between the cylindrical body portion 21 and the flange 23 there is formed a curved peripheral surface 24 which conforms in shape with the curved surface 18 of the embossment 17. The cylindrical body portion 21 is preferably of the same size as the central opening 16 pierced in the upper wall of the fuel cylinder 10.

Figure 2:
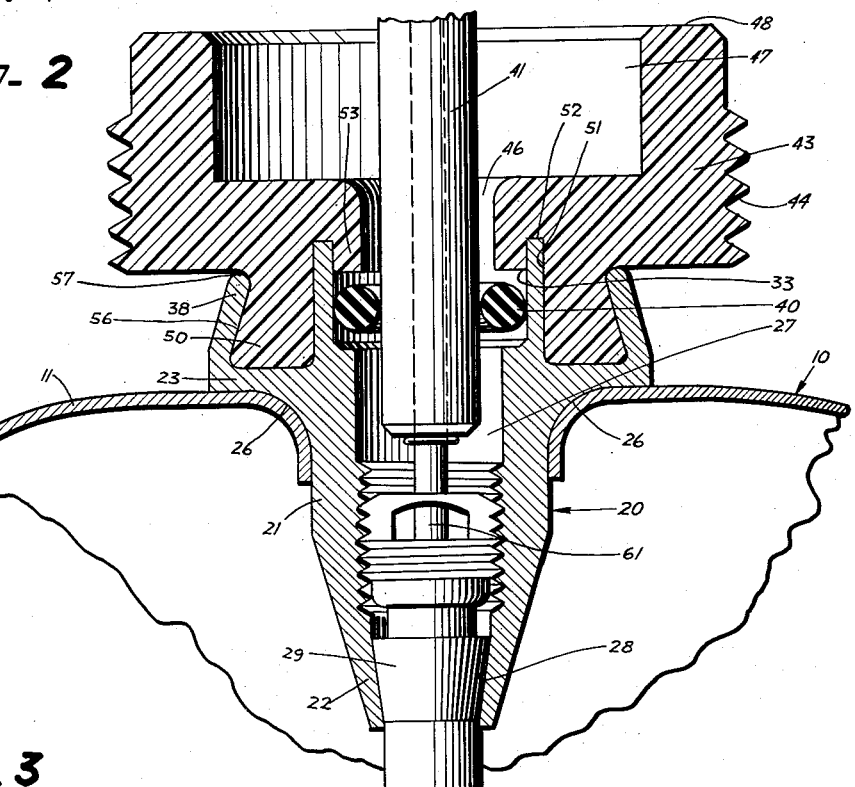
FIGURE 2 shows all of the components of FIGURE 1 in final assembled relationship and with the pusher pin of a fuel-consuming appliance in position to actuate the movable stem of the valve.

In order to place the metal bushing 20 in firm assembly with the fuel cylinder 10, a suitable copper brazing material is placed on the surfaces 18 and 24 and the two components are subjected to controlled temperature conditions as in a brazing furnace to complete a sealed-together bonded assembly forming a copper brazed sealed joint indicated in FIGURE 2 at 26.

The bushing 20 is particularly characterized by a through passage 27. At the innermost end of the passage, there is an inwardly tapered portion 28 which forms a seat for a correspondingly tapered portion 29 on a tire valve shown generally at 30.

Above the tapered portion 28 in the passage 27, there is formed an inner threaded portion 31 which receives in threaded-together relation the correspondingly threaded portion 32 of the tire valve 30.

The passage 27 is counterbored as at 33, thereby forming a radial shoulder 34.

After the bushing 20 has been placed in firm assembly with the fuel cylinder 10, the tire valve 30 is screw-threaded into assembled relationship and the tapered portion 29 seats securely against the correspondingly tapered portion 28 of the bushing 20. At this point in the fabricating procedure, it is already possible to test the assembly for leaks. The fact that the bushing 20 is assembled by brazing in the pierced opening 16 insures the integrity of the joint. Further, by using the brazed joint 26 and the direct metal-to-metal relationship of the metal bushing 20 with the embossed walls of the fuel cylinder 10, there are no mixed materials such as occurs with other prior art constructions wherein metal parts are sometimes crimped together in association with sealing gaskets and other sealing materials.

At this point in the fabricating procedure, it is also possible to fill the fuel cylinder 10 with fuel, for example, propane or any other desired fuel required to be used in the fuel cylinder 10. In this regard, note that the shoulder 34 at the bottom of the counterbore 33 provides a greatly reduced sealing area which facilitates filling of the tank at reduced unit pressures and without the difficulties which are inherent in fuel cylinder assemblies utilizing crimped joints.

The bushing 20 is particularly characterized by the formation of inner and outer rings shown at 36 and 38, respectively. The inner ring 36 immediately surrounds the counterbore 33. The outer ring 38 is concentrically disposed with respect to the inner ring 36 and is in upstanding relation relative to the flange 23. Thus, the inner and outer rings 36 and 38 together form an annular recess 39.

An O ring sealing member 40 is provided which has an outer diameter sized to engage the side walls of the counterbore 33 and an inner diameter sized to engage the outer peripheral surface of the pusher pin 41 shown in FIGURE 2 as entering the passage 27.

In order to couple the fuel cylinder assembly 10 to a fuel-consuming appliance, there is provided a coupling member made of a plastic material and shown generally at 42. The coupling member 42 is of generally cylindrical configuration and includes a ring-shaped body portion 43 which is externally threaded as at 44. A center passage 46 is provided which is counterbored as at 47. The body portion 43 has an upper face 48 and a lower radial face 49 which is characterized by a depending annular lip 50. The lip 50 has a radial inner wall 51 prescribing a circular configuration conformably shaped to the inner ring 36. In this regard, an annular recess 52 is formed at the bottom of the opening 51 and it may be noted that the passage 46 is of lesser diameter than the O ring 40, thereby providing an annular shoulder 53 which serves to retain the O ring 40 in assembled relation within the counterbore 33.

The lip 50 has a radial end face 54 and an outer peripheral wall 56 which tapers radially inwardly, thereby to form a recess 57. The widest portion of the lip 50 at the end face 54 is of such a dimension as to be readily received within the annular recess 39.

Accordingly, after the O ring 40 is inserted into the counterbore 33, the bushing is placed in position with the lip 50 received within the annular recess 39 and the outer ring 38 is offset radially inwardly by crimping as shown in FIGURE 2.

Because of the recessed lip construction, the plastic bushing 42 and the metal bushing 20 are pulled together axially so that the two parts are clamped tightly in axial direction by the crimping operation. Further, the shape of the recessed lip 50 and the cooperation therewith of the outer ring 38 minimizes the weakness of the weakest cross-sectional point by, in effect, filling the reduced area with the metal of the bushing 20. Thus, the plastic coupling member 42 need only function as a coupling member and is not necessary to establish or to maintain any of the seals required for the proper utilization of the fuel cylinder with a fuel consuming appliance.

A cup-shaped paper cap 60 is assembled over the bushing construction and the completed fuel cylinder assembly is then ready to be shipped.

In usage, the pusher pin 41 of the appliance will enter the passage 27 and engages against a valve stem 61, thereby to admit fuel from the fuel cylinder 10 into the passage 27.

Although minor modifications might be suggested by those versed in the art, it should be understood that I wish to embody within the scope of the patent warranted hereon all such modifications as reasonably and properly come within the scope of my contribution to the art.

I claim as my invention:

1. A fuel cylinder assembly comprising,
a tank having an embossed opening formed therein,
a bushing in said opening,
a circumferential joint sealing and retaining said bushing in said tank in firm leak-proof assembly with one another,
a tire valve confined in said bushing to control the outward flow of fuel therethrough,
   said bushing having upstanding inner and outer rings forming an annular recess,
and a ring shaped coupling member having a passage extending axially therethrough affording access to said tire valve for effecting discharge of fuel from said tank,
said coupling member being made of nylon material and including a threaded coupling portion and a circumferentially extending lip projecting from one radial face thereof,
   said lip projecting into said annular recess,
   said outer ring being offset radially inwardly to confine said lip bindingly between said inner outer rings and to retain said coupling member in firm assembly with said bushing.

2. In combination,
a valve having a valve body through which pressurized fluid is directed and a valve stem actuator projecting axially out of one end of said valve body,
a metal cylindrical bushing screw threaded to said valve body and having a flow passage extending axially of said valve stem actuator,
   said bushing having a radially outwardly extending flange,
a cylinder for containing a supply of pressurized fluid and having an opening formed therein,
   said cylindrical bushing projecting into said opening and said flange overlying the edges of said opening,
a circumferentially continuous joint connecting said flange in leak-proof assembly with said cylinder,
   said flange having upstanding inner and outer concentrically spaced rings,
and a ring shaped coupling member having a passage extending axially therethrough for affording access to said valve and said valve stem actuator,
   said coupling member having upper and lower radial faces and an externally threaded peripheral coupling portion,
   said lower face having a circumferentially extending lip projecting therefrom between said inner and outer rings,
   said lip having an outer peripheral wall which is recessed radially inwardly,
   said outer ring being offset radially inwardly into the recessed portions of said outer peripheral wall,
   said lip having an inner wall tightly engaging said inner ring,
whereby said lip is bindingly confined between said inner and outer rings.

3. A fuel cylinder assembly comprising,
a tank for containing a supply of fuel under pressure and having an opening formed in a wall thereof through which the fuel is discharged,
a valve having an axially movable actuator stem in said opening to control the discharge of the fuel,
a generally cylindrical metal bushing threadedly connected to said valve and having an axial body portion extending through said opening and a radially outwardly extending flange portion overlying the edges of said opening,
a circumferentially continuous joint connecting said flange and said tank in sealed tight assembly,
   said bushing having an axial passage formed with a counterbore at the end thereof,
an O ring sealing member received in said counter bore for sealing against the walls of said passage and adapted to seal against the adjoining surface of a pusher pin when extended through said axial passage for engagement with said actuator stem and for carrying fuel discharged by said valve,
inner and outer axial rings on said flange forming an annular recess therebetween,
   said outer ring being offset radially inwardly,
and a nylon bushing having external peripheral coupling threads for engagement with a fuel consuming appliance and an axial passage through which the pusher pin may be extended,
   said nylon bushing having a depending lip with circumferentially extending inner and outer axial walls,
   said inner wall tightly engaging said inner ring and said outer wall tightly engaging said offset outer ring, whereby said lip is bindingly confined between said inner and outer rings.

4. A fuel cylinder assembly defined in claim 3, said nylon bushing having abutment means extending radially inwardly of said inner ring to confine said O ring sealing member in said counterbore.

5. A fuel cylinder assembly as defined in claim 3 and further characterized by said outer wall of said depending lip being preformed to taper radially inwardly with the widest portion of the lip seating in the bottom of said recess, whereby the shape of the lip and the cooperation of the outer ring effectively fills the reduced area with the metal of the bushing.

6. A fuel cylinder assembly as defined in claim 3 wherein said circumferentially continuous joint comprises a copper brazed connection.

7. A fuel assembly as defined in claim 3, said tank having the edges of said opening formed as an inwardly turned embossment and said bushing having the adjoining axial body portion and flange conformably shaped to engage said embossment, said opening and said axial body portion being of the same size.

References Cited in the file of this patent

UNITED STATES PATENTS

| | | |
|---|---|---|
| 2,839,228 | Levine | June 17, 1958 |
| 2,873,897 | Kneusel | Feb. 17, 1959 |
| 3,029,981 | Webster et al. | Apr. 17, 1962 |